(12) United States Patent
Ochiishi (10) Patent No.: US 9,381,651 B2
(45) Date of Patent: Jul. 5, 2016

(54) TRANSFER DEVICE SUCKING AND TRANSFERRING OBJECT

(71) Applicant: FANUC CORPORATION, Yamanashi (JP)

(72) Inventor: Yoshinori Ochiishi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 57 days.

(21) Appl. No.: 14/321,230

(22) Filed: Jul. 1, 2014

(65) Prior Publication Data

US 2015/0016933 A1    Jan. 15, 2015

(30) Foreign Application Priority Data

Jul. 4, 2013  (JP) .................................. 2013-140648

(51) Int. Cl.
  *B25J 15/06*    (2006.01)
  *B25J 15/00*    (2006.01)
  *B25J 9/16*     (2006.01)
  *B65G 49/06*    (2006.01)

(52) U.S. Cl.
  CPC ............ *B25J 15/0616* (2013.01); *B25J 9/1612* (2013.01); *B25J 15/0052* (2013.01); *B65G 49/061* (2013.01); *Y10S 901/40* (2013.01)

(58) Field of Classification Search
  CPC .. B25J 15/0616; B25J 15/0052; B25J 9/1612; B65G 49/061; Y10S 901/40
  See application file for complete search history.

(56) References Cited

U.S. PATENT DOCUMENTS

| 3,198,348 | A | * | 8/1965 | Cummings | ............ | B65G 60/00 |
| | | | | | | 198/575 |
| 4,648,588 | A | * | 3/1987 | Carrell | ..................... | B25J 15/02 |
| | | | | | | 271/108 |
| 5,324,087 | A | * | 6/1994 | Shimose | ................. | B65G 47/91 |
| | | | | | | 294/185 |
| 6,393,336 | B1 | * | 5/2002 | Kano | ..................... | G01L 27/007 |
| | | | | | | 700/228 |
| 6,431,624 | B1 | * | 8/2002 | Dunger | ................. | B25J 15/0616 |
| | | | | | | 294/186 |
| 6,979,032 | B2 | * | 12/2005 | Damhuis | .............. | B25J 15/0052 |
| | | | | | | 294/185 |
| 8,365,389 | B2 | | 2/2013 | Taylor | | |
| 2009/0028681 | A1 | * | 1/2009 | Huang | ................. | B25J 15/0052 |
| | | | | | | 414/590 |

FOREIGN PATENT DOCUMENTS

| CN | 101683735 | 3/2010 |
| DE | 10245716 | 3/2004 |
| JP | 57-170990 | 10/1982 |
| JP | 63-99192 | 4/1988 |
| JP | 63-158744 | 10/1988 |
| JP | 09-285986 | 11/1997 |
| JP | 2005-230944 | 9/2005 |
| JP | 2011-243673 | 12/2011 |
| JP | 2012-240166 | 12/2012 |

* cited by examiner

*Primary Examiner* — Scott Lowe
(74) *Attorney, Agent, or Firm* — RatnerPrestia (57) ABSTRACT

A transfer device includes a suction unit capable of sucking an object and a transfer unit moving the suction unit. The suction unit includes a base member; a plurality of nozzles provided for a plurality of types of objects; a housing room formation unit attached to the base member, forming a housing room for housing the other end portion side of the plurality of nozzles, and including a sealing unit facing air outlets; a negative pressure generation unit generating negative pressure inside the housing room; and a drive unit driving the plurality of nozzles such that the air outlet of a nozzle selected from the plurality of nozzles in accordance with a type of the object is separated from the sealing unit, and the air outlet of a non-selected nozzle is bumped against the sealing unit to be sealed.

7 Claims, 6 Drawing Sheets

TRANSFER DEVICE SUCKING AND TRANSFERRING OBJECT

BACKGROUND OF THE INVENTION

1. Field of the Invention

The present invention relates to a transfer device sucking and transferring an object.

2. Description of the Related Art

There is known a device that sucks an object such as a workpiece via a nozzle, and transfers the object. According to the device described in Japanese Laid-open Patent Publication No. 2012-240166 (JP 2012-240166 A), an object is sucked by using a single nozzle attached at a distal end portion of a robot. According to the device described in Japanese Laid-open Patent Publication No. 2011-243673 (JP 2011-243673 A), a nozzle is detachably mounted on a mounting head, and the nozzle adapted for a type of an object is used to suck the object.

However, in a configuration for using a single nozzle as in the device described in JP 2012-240166 A, it is difficult to suck various types of objects. In a configuration for replacing a nozzle in accordance with a type of an object as in the device described in JP 2011-243673 A, the configuration of the device is complicated, and in addition, working efficiency is reduced.

SUMMARY OF THE INVENTION

A transfer device according to one aspect of the invention includes a suction unit capable of sucking an object; and a transfer unit moving the suction unit, in which the suction unit comprises: a base member attached to the transfer unit; a plurality of nozzles provided for a plurality of types of objects, each of the nozzles including an air inlet at an end portion and an air outlet at another end portion; a housing room formation unit attached to the base member, forming a housing room for housing the other end portion side of the plurality of nozzles, and including a sealing unit facing the air outlets; a negative pressure generation unit generating negative pressure inside the housing room; and a drive unit driving the plurality of nozzles such that the air outlet of a nozzle selected from the plurality of nozzles in accordance with a type of the object is separated from the sealing unit, and the air outlet of a non-selected nozzle is bumped against the sealing unit to be sealed.

BRIEF DESCRIPTION OF THE DRAWINGS

The objectives, features, and advantages of the present invention will become further apparent from the following description of embodiments in conjunction with the accompanying drawings, in which.

DETAILED DESCRIPTION

Figure 1:
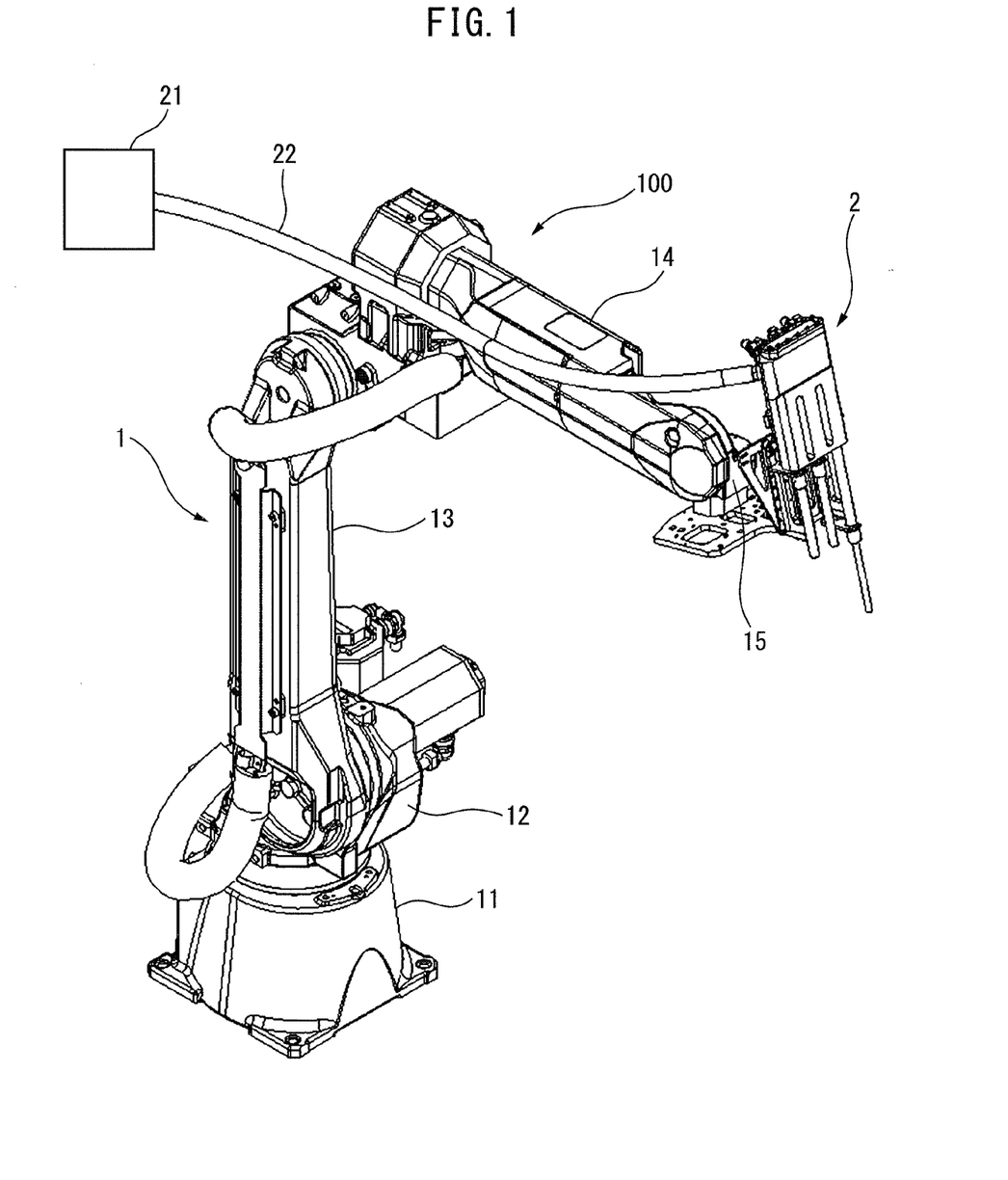
FIG. 1 is a perspective view illustrating an entire configuration of a transfer device according to an embodiment of the present invention.

Embodiments of the present invention will be explained below with reference to FIG. 1 to FIG. 7. FIG. 1 is a perspective view illustrating an entire configuration of a transfer device 100 according to an embodiment of the present invention. The transfer device 100 includes an industrial robot 1 and a suction device 2.

The robot 1 includes a base 11, a turn unit 12 provided turnably on the upper side of the base 11, a lower arm 13 supported rotatably at the turn unit 12, an upper arm 14 supported rotatably at a distal end portion of the lower arm 13, and a hand unit 15 supported rotatably at a distal end portion of the upper arm 14. The suction device 2 is provided at a distal end portion of the hand unit 15. The turn unit 12, the lower arm 13, the upper arm 14, and the hand unit 15 are driven by servomotors (robot drive motors 16 in FIG. 5), respectively so that the turn unit 12 is rotated relative to the base 11, the lower arm 13 is rotated relative to the turn unit 12, the upper arm 14 is rotated relative to the lower arm 13, and the hand unit 15 is rotated relative to the upper arm 14. Accordingly, the suction device 2 can move in a three-dimensional space by operation of the robot 1, and a posture of the suction device 2 can be changed.

Figure 2:
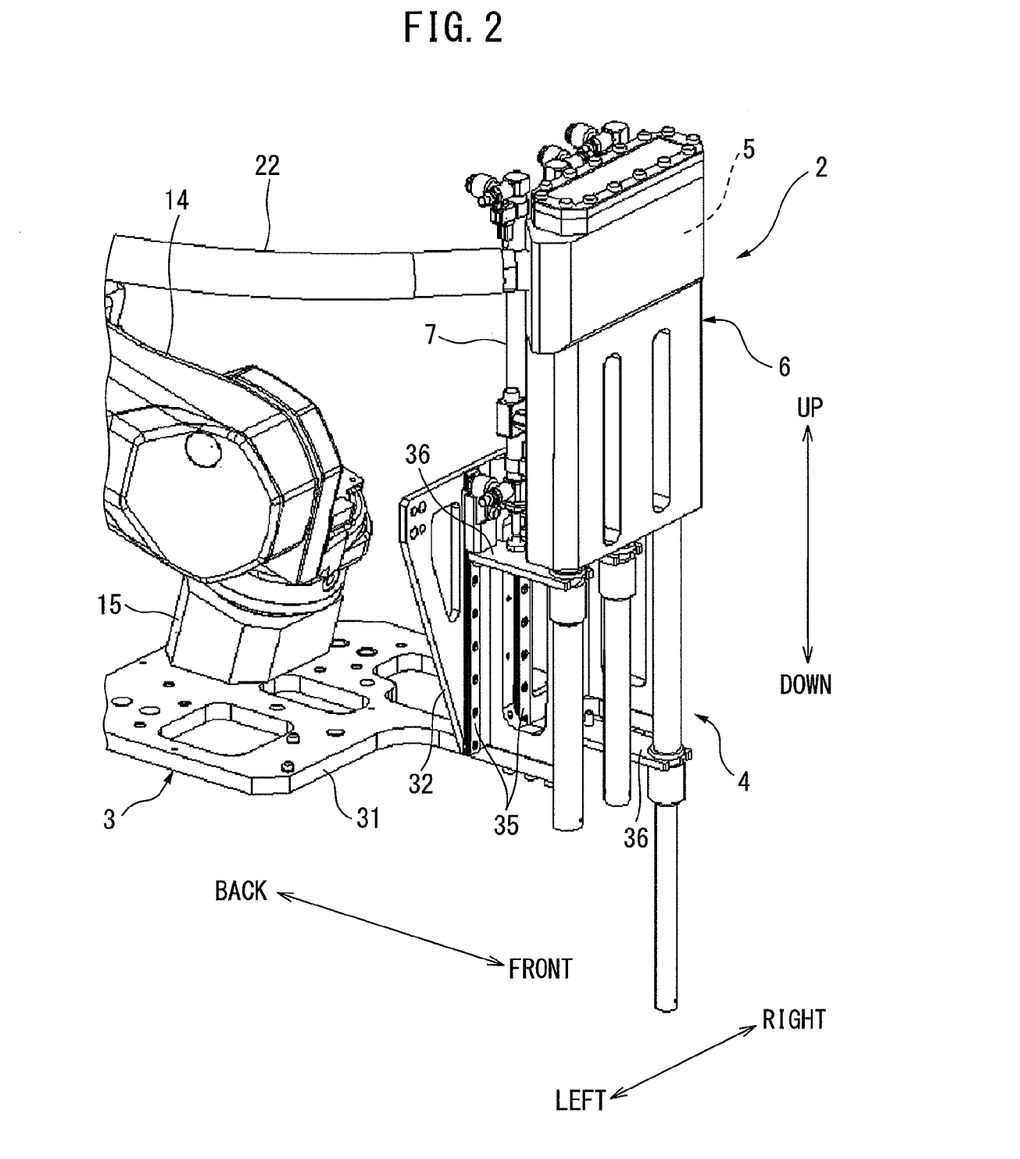
FIG. 2 is an enlarged perspective view of a suction device constituting the transfer device in FIG. 1.
Figure 3:
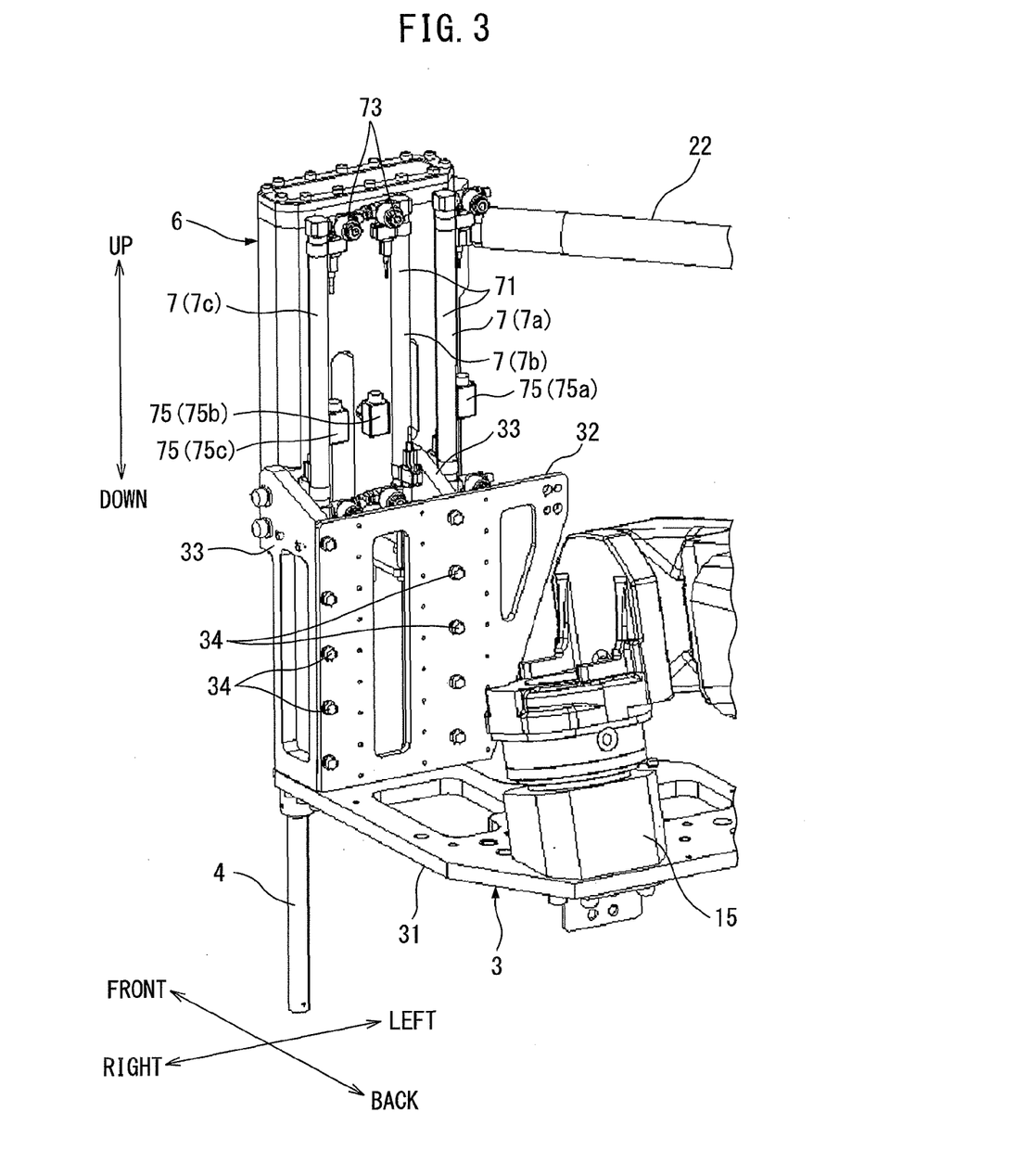
FIG. 3 is a further enlarged perspective view of the suction device constituting the transfer device in FIG. 1.

FIG. 2 is an enlarged perspective view of the suction device 2 in FIG. 1. FIG. 3 is an enlarged perspective view of the suction device 2 seen from a direction different from that of FIG. 2. For convenience, a front-back direction, a right-left direction, and an up-down direction are defined by the illustration in the drawings. In accordance with this definition, a configuration of the suction device 2 is described in the following. FIG. 2 illustrates the suction device 2 seen from an obliquely forward side, and FIG. 3 illustrates the suction device 2 seen from an obliquely backward side.

As illustrated in FIG. 2 and FIG. 3, the suction device 2 includes a base member 3 attached to the distal end portion of the hand unit 15, a plurality of (in the drawing, three) nozzles 4 provided on the front side of the base member 3 such that the nozzles 4 can ascend and descend (move in the up-down direction), a housing 6 attached to the base member 3 and forming a housing room 5 that houses upper portions of a plurality of the nozzles 4, a suction hose 22 including an end portion connected to the housing room 5 and another end portion connected to a suction pump 21 (FIG. 1), and a plurality of (three) air cylinders 7 moving a plurality of the nozzles 4 individually upward and downward.

The base member 3 is fixed to the hand unit 15, and includes a flat plate unit 31 extending in the front-back direction and in the right-left direction, and a flat plate unit 32 rising upward from a front end portion of the flat plate unit 31. On a front surface of the flat plate unit 32, a pair of right and left side plates 33 extending in the up-down direction is fixed by bolts 34, and supports the housing 6. On the front surface of the flat plate unit 32, a plurality of (three) guides 35 in the right-left direction are provided corresponding to the respective nozzles 4 and extend in the up-down direction, and holding plates 36 are respectively supported so as to ascend and descend along the respective guides 35.

Figure 4:
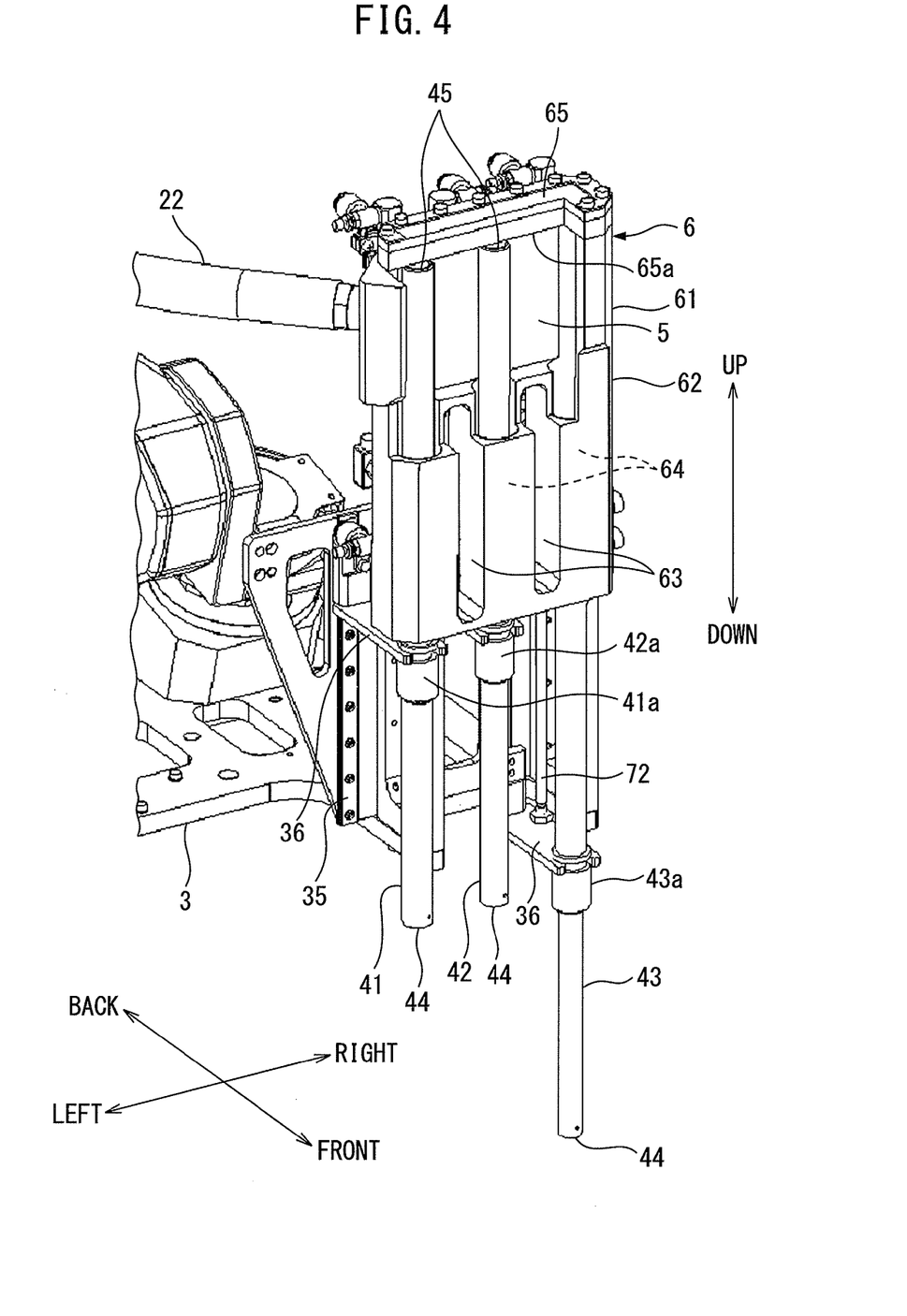
FIG. 4 is a perspective view illustrating a state in which a part of a housing constituting the suction device in FIG. 2 is cut out.

FIG. 4 is a perspective view illustrating a state in which a part of the housing 6 in FIG. 2 is cut out. A plurality of nozzles 4 are approximately cylindrical in shape, and have diameters different from each other so as to be adapted for types of objects. In FIG. 4, when the left, center, and right nozzles 4 are represented by the numerical symbols 41, 42, and 43, a diameter of the nozzle 41 is the largest, and a diameter of the nozzle 43 is the smallest. Lengths of the nozzles 41 to 43 in the up-down direction are equal to each other. The nozzles 41 to 43 each include an air inlet 44 at a lower end thereof, and an air outlet 45 at an upper end thereof. At centers of the nozzles 41 to 43 in the up-down direction, held units 41a to 43a held by the holding plates 36 are provided. Ascending and descending operation of the holding plates 36 moves the nozzles 41 to 43 upward and downward.

The housing 6 is roughly classified into an upper housing unit 61 and a lower housing unit 62 of which boundary is a center of the housing 6 in the up-down direction. The upper housing unit 61 forms the single box-shaped housing room 5 over an entire range of the housing 6 in the right-left direction. In the lower housing unit 62, elongate holes 63 penetrating the lower housing unit 62 in the front-back direction are provided at two right and left positions. The lower housing unit 62 is divided into three units in the right-left direction of which boundaries are the elongate holes 63. At the divided respective lower housing units 62, penetration holes 64 are respectively provided to be opened in the up-down direction. The housing room 5 in the upper housing unit 61 is branched into the three penetration holes 64. The nozzles 41 to 43 are respectively inserted into the respective penetration holes 64 so as to be slidable. Between each outer circumferential surface of the nozzles 41 to 43 and each inner circumferential surface of the penetration holes 64, seal units not illustrated are provided to secure the seal of the housing room 5.

As illustrated in FIG. 3 and FIG. 4, a plurality of air cylinders 7 (7a to 7c) provided for the nozzles 41 to 43 are arranged between the flat plate unit 32 of the base member 3 and the housing 6, and extend in the up-down direction. Each of the air cylinders 7 includes a cylinder unit 71 fixed to the base member 3 (the flat plate unit 32 and the side plate 33), and a rod unit 72 slidably inserted into the cylinder unit 71. The holding plate 36 is fixed to a lower end portion of the rod unit 72. At an upper end portion of the cylinder unit 71, an air supply unit 73 is provided to which, a compressed air is supplied via a hose not illustrated. Supply of the compressed air from the air supply unit 73 to the cylinder unit 71 is controlled to expand and contract the air cylinder 7. Thereby, the holding plate 36 moves upward and downward integrally with the nozzle 4.

In FIG. 4, the nozzles 41 and 42 are moved upward to the upper limit position. This state is referred to as a housed state. In the housed state, upper end portions of the nozzles 41 and 42 are pressed against an inner wall face 65a of an upper wall 65 of the housing 6, and the air outlets 45 are closed. At this time, portions of the nozzles 41 and 42 that are positioned below the held units 41a and 42a protrude from the housing 6. Meanwhile, in FIG. 4, the nozzle 43 is moved downward to the lowest position. This state is referred to as a used state. In the used state, an upper end portion of the nozzle 43 is separated from the inner wall face 65a, and is at an intermediate position in the penetration hole 64, and the air outlet 45 faces the housing room 5, and is opened. At this time, the nozzle 43 protrudes downward more than the other nozzles 41 and 42. In each case of the used state and the housed state, the air inlet 44 faces the atmosphere.

As illustrated in FIG. 3, a plurality of (three) pressure sensors 75 (75a to 75c) for the nozzles 41 to 43 are attached to a backward face of the housing 6. The respective pressure sensors 75 communicate with the three penetration holes 64 of the lower housing unit 62, more specifically, spaces above the air outlets 45 of the nozzles 4 in the used state. When an object is sucked to the lower end portion of the nozzle 4, the air inlet 44 is closed, and flow of air in the nozzle 4 is stopped. At this time, a detection value of the pressure sensor 75 changes. On the basis of the change in the detection value of the pressure sensor 75, it can be determined whether or not an object has been sucked.

Figure 5:
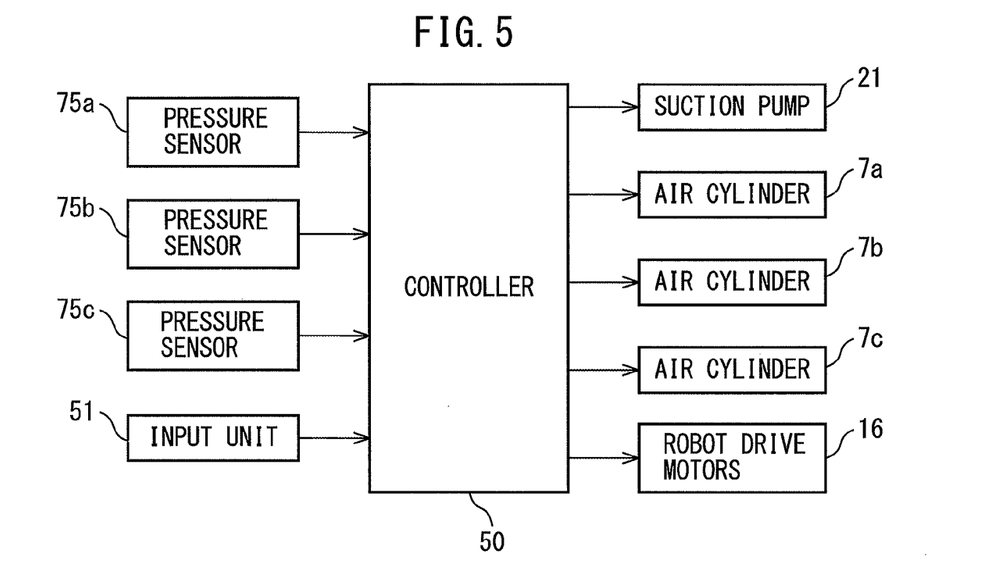
FIG. 5 is a block diagram illustrating a control configuration of the transfer device according to the embodiment of the present invention.

FIG. 5 is a block diagram illustrating a control configuration of the transfer device 100 according to the present embodiment. The controller 50 is configured so as to include an arithmetic processing unit including a CPU, a ROM, a RAM, additional peripheral circuits, and the like. An input unit 51 and the pressure sensors 75a to 75c are connected to the controller 50. The input unit 51 inputs a command for starting to transfer an object, a type of an object, and the like. On the basis of signals from the input unit 51 and the pressure sensors 75a to 75c, the controller 50 performs predetermined processes to output control signals to the suction pump 21, the air cylinders 7a to 7c, and the robot drive motors 16.

Figure 6:
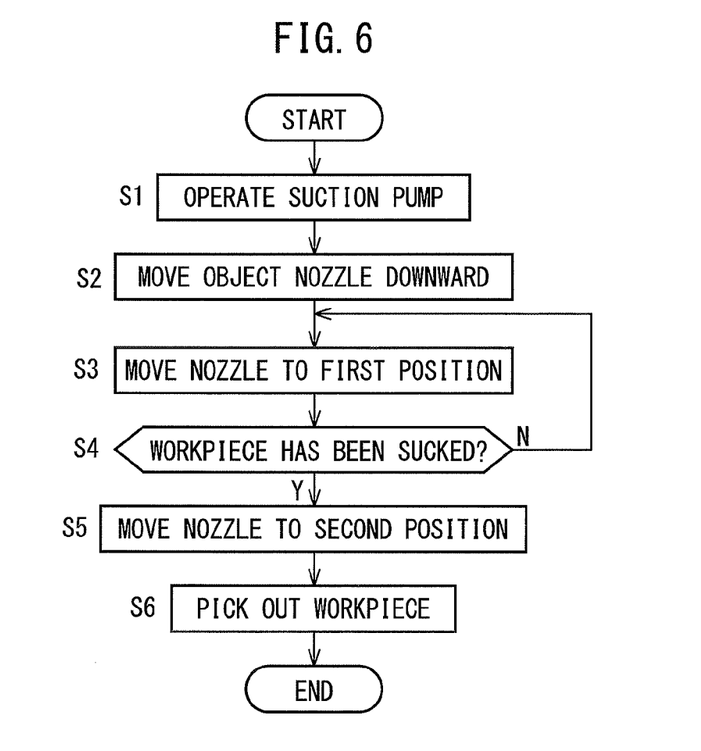
FIG. 6 is a flowchart illustrating an example of processes performed by a controller in FIG. 5.

FIG. 6 is a flowchart illustrating one example of the processes at the controller 50 at the time of object transfer operation. In the object transfer operation, a designated workpiece is taken out from workpieces as objects heaped at a first position, and the taken-out workpiece is then transferred to a second position. The flowchart is started by, for example, inputting a type (a shape, a size, and the like) of a workpiece by operating the input unit 51, and then inputting a transfer start command. Before a transfer start command is input, all of the nozzles 41 to 43 are moved to be in the housed state. Instead of inputting a type of a workpiece by the input unit 51, identification of the nozzle 41, 42 or 43 to be used may be input.

At the step S1, a control signal is output to the suction pump 21 to cause the suction pump 21 to operate. At this time, air does not flow in the nozzles 41 to 43 since the air outlets 45 of the nozzles 41 to 43 contact with the inner wall face 65a of the upper wall 65 of the housing 6.

At the step S2, the nozzle 4 adapted for the type of a workpiece input by the input unit 51 is selected as an object nozzle. For example, when the workpiece is large, the nozzle 41 having the large diameter is selected, and when the workpiece is small, the nozzle 43 having the small diameter is selected. On the assumption that the nozzle 43 is selected, and the nozzles 41 and 42 are not selected, description is made in the following.

Further, at the step S2, a control signal is output to the air cylinder 7c corresponding to the selected object nozzle 43 to move the air cylinder 7c downward. Accordingly, the object nozzle 43 is moved downward as illustrated in FIG. 4, and the air outlet 45 is opened. In other words, the object nozzle 43 is set in the used state. As a result, air flows in the object nozzle 43 through the air inlet 44, and negative pressure is generated in the housing room 5. Thereby, suction of a workpiece by the object nozzle 43 is enabled. In this case, the other nozzles 41 and 42 are left in the housed state. Accordingly, air does not flow in the other nozzles 41 and 42, and the other nozzles 41 and 42 can be prevented from sucking the workpiece.

At the step S3, a control signal is output to corresponding robot drive motor 16 to move the object nozzle 43 toward the first position.

At the step S4, on the basis of detection values from the pressure sensors 75a to 75c, it is determined whether or not the object nozzle 43 has contacted with a workpiece. Specifically, when the lower end portion of the object nozzle 43 contacts with a workpiece in a state in which the object nozzle 43 has moved downward, the workpiece is sucked to close the air inlet 44, and a detection value of the pressure sensor 75c changes. Accordingly, at the step S4, by determining whether or not a detection value of the pressure sensor 75c changes beyond a predetermined threshold, it is determined whether or not the object nozzle 43 has contacted with a workpiece. When a positive decision at the step S4 is made, the procedure advances to the step S5. When a negative decision at the step S4 is made, the procedure returns to the step S3.

At the step S5, a control signal is output to corresponding robot drive motor 16 to move the object nozzle 43 toward the second position while maintaining the object nozzle 43 in the used state, i.e., keeping the object nozzle 43 protruded more than the other nozzles 41 and 42.

At the step S6, operation of the suction pump 21 is stopped in a state where the object nozzle 43 has arrived at the second position. Thereby, the workpiece is removed (is taken to be placed) from the object nozzle 43. Thus, the workpiece is transferred to the second position.

According to the present embodiment, the following advantageous effects can be obtained.

(1) The suction device 2 includes the base member 3 attached to the robot 1; a plurality of the nozzles 41 to 43 provided for a plurality of types of objects; the housing 6 attached to the base member 3, the housing 6 forming the housing room 5 which houses the parts included in a plurality of the nozzles 41 to 43 and positioned on the side of the air outlets 45, the housing 6 including the inner wall face 65a facing the air outlets 45; the suction pump 21 generating negative pressure inside the housing room 5; and the air cylinders 7 driving a plurality of the nozzles 41 to 43 such that the air outlet 45 of the nozzle 43 selected from a plurality of the nozzles 41 to 43 in accordance with the type of an object is separated from the inner wall face 65a, and the air outlets 45 of non-selected nozzles 41 and 42 are bumped against the inner wall face 65a to be sealed.

Accordingly, it is not necessary to change the nozzles 4 in accordance with a type of an object, and with a simple configuration, operation of transferring a plurality of types of objects can be performed efficiently. Further, in a device including a plurality of the nozzles 7, it is not necessary to provide electromagnetic valves for switching, from each other, suction lines extending to the respective nozzles 7, and the transfer device 100 can be configured easily and at low cost. In other words, when a plurality of nozzles are simply attached to a robot, and a suction pump is connected to the respective nozzles via electromagnetic valves, an suction hose and the electromagnetic valve are necessary for each nozzle. In this case, since a plurality of the suction hoses are needed, it is difficult to stretch and arrange the suction hoses. In addition, when the electromagnetic valves are installed at a distal end portion of the robot, a weight at the distal end portion of the robot increases, and accordingly, for this weight, a robot capable of transferring a heavy object is demanded. In this regard, in the present embodiment, electromagnetic valves for switching suction lines from each other do not need to be used. For this reason, increase in a weight at a distal end portion of the robot can be prevented, and the suction hose 22 can be easily stretched and arranged.

(2) The suction device 2 is attached to the general-purpose robot 1. For this reason, it is possible to easily pick out and place an object over a wide range.

(3) The air cylinders 7 move the nozzles 4 to set the nozzles 4 in the used state or the housed state. For this reason, when the nozzle 4 is moved to the first position, and a distal end of the nozzle is thereby pressed against an object, the air cylinder 7 expands and contracts so that damage to the object can be reduced.

(4) The pressure sensors 75a to 75c are provided for the nozzles 41 to 43, respectively. On the basis of detection values of the pressure sensors 75a to 75c, it is determined whether or not an object has been sucked. For this reason, transferring an object can be securely carried out with the object being sucked.

Figure 7:
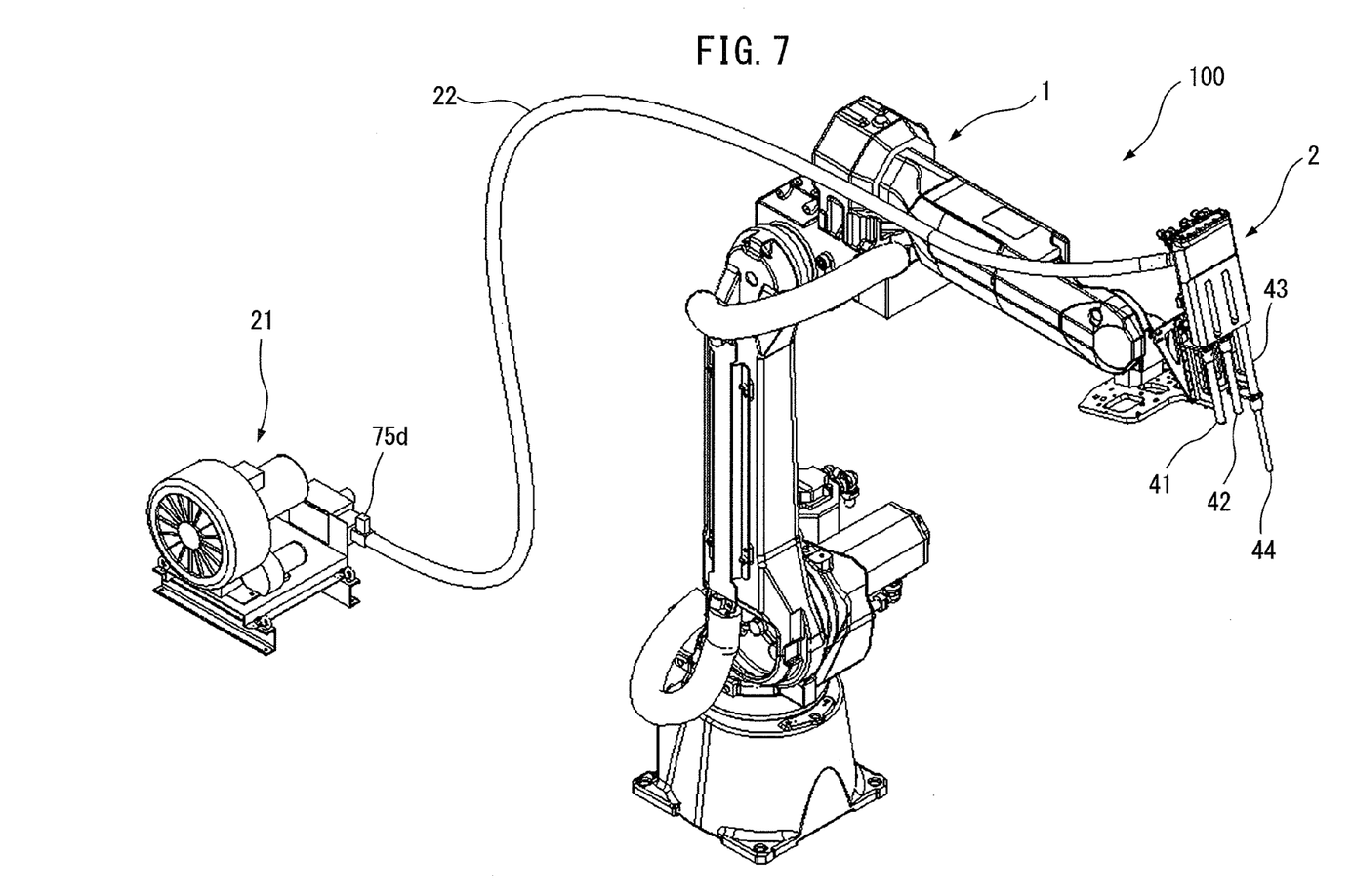
FIG. 7 is a perspective view of a transfer device according to a modified example of FIG. 1.

Although, in the above-described embodiment, the pressure sensors 75a, 75b, and 75c are provided for the nozzles 41 to 43, respectively, a pressure sensor 75 as a pressure detector may be provided at a different position. FIG. 7 is a perspective view of a transfer device 100 according to a modified example of FIG. 1. In FIG. 7, a pressure sensor 75d is provided at the suction hose 22 connecting the suction device 2 and the suction pump 21 to each other. In this case, when a workpiece is sucked to the lower end portion of the object nozzle 43, the air inlet 44 is closed, which causes a change air flow in the suction hose 22. This enables the controller 50 as a determination unit to determine whether or not the workpiece has been sucked. With the configuration of FIG. 7, the number of the pressure sensors 75 can be reduced, and the transfer device 100 can be configured at lower cost.

In the above-described embodiment, the suction device 2 as a suction unit is transferred by the robot 1. However, a device other than the robot 1 may be used as a transfer unit. In the above-described embodiment, a single nozzle (for example, the nozzle 43) selected from a plurality of the nozzles 41 to 43 in accordance with a type of an object is set in the used state, and non-selected nozzles (for example, the nozzles 41 and 42) are set in the housed state. However, a plurality of the nozzles may be selected to be set in the used state. In the above, a plurality of the nozzles 41 to 43, each of which has the same lengths, have the different diameters from each other. However, as long as the nozzles have the air inlets 44 and the air outlets 45, the nozzles may have lengths different from each other and shapes different from each other. In the above, in the housed states, the air outlet 45 of the nozzle 4 is made to contact with the inner wall face 65a of the housing 6. However, as long as air flow in the nozzle 4 is stopped, a constituent element other than the inner wall face 65a may be used as a sealing unit. In the above-described embodiment, the air cylinders 7 drive a plurality of the nozzles 4. However, a configuration of a drive unit is not limit to this.

In the above-described embodiment, the suction pump 21 is connected to the suction device 2 via the suction hose 22 to generate negative pressure inside the housing room 5. However, a configuration of a negative pressure generation unit is not limited thereto. In the above-described embodiment, the housing 6 forms the housing room 5. However, as long as a housing room formation unit is attached to the base member 3, forms the housing room 5, and includes the sealing unit facing the air outlet 45, a configuration of the housing room formation unit is arbitrary.

The above-described embodiment can be combined arbitrarily with one or a plurality of the modified examples.

According to the present invention, the air outlet of the nozzle selected in accordance with a type of an object is separated from the sealing unit, and the air outlet of non-selected nozzle is bumped against the sealing unit to be sealed. Accordingly, with a simple device configuration, operation of transferring various types of objects can be efficiently performed.

In the above, the present invention is described with reference to the preferred embodiment of the present invention. However, it would be understood by a person skilled in the art that various modifications and alterations can be made without departing from the disclosure range in the claims described later.

The invention claimed is:

1. A transfer device comprising:
 a suction unit capable of sucking an object; and
 a transfer unit moving the suction unit, wherein the suction unit comprises:
 a base member attached to the transfer unit;
 a plurality of nozzles provided for a plurality of types of objects, each of the nozzles including an air inlet at an end portion and an air outlet at another end portion;
 a housing chamber formation unit attached to the base member, forming a chamber for housing said another end portion of each of the plurality of nozzles, and including a sealing unit located at an end of said chamber and facing the air outlets of the plurality of nozzles;
 a negative pressure generation unit generating negative pressure inside the chamber; and
 a drive unit driving the plurality of nozzles such that the air outlet of a nozzle selected from the plurality of nozzles in accordance with a type of the object is separated from the sealing unit, and the air outlet of a non-selected nozzle is positioned against the sealing unit to be sealed.

2. The transfer device according to claim 1, wherein the transfer unit is a robot.

3. The transfer device according to claim 1, wherein the drive unit is constituted by air cylinders.

4. The transfer device according to claim 1, further comprising: a plurality of pressure detectors respectively attached to the plurality of nozzles to detect inside pressure of respective nozzles; and a determination unit determining whether or not the object has been sucked, for each of the plurality of nozzles, on the basis of detection values of the pressure detectors.

5. The transfer device according to claim 1, wherein the negative pressure generation unit includes a suction pump, and a suction hose of which an end portion is connected to the chamber and of which another end portion is connected to the suction pump, and the transfer device further comprises: a pressure detector attached to the suction hose to detect inside pressure of the suction hose; and a determination unit determining whether or not the object has been sucked, on the basis of a detection value of the pressure detector.

6. The transfer device according to claim 1, wherein the sealing unit is a single flat planar surface defined at said end of the chamber.

7. The transfer device according to claim 1, wherein each nozzle comprises a hollow cylinder and the air inlet and the air outlet of the nozzle are positioned at opposite ends of the hollow cylinder.

* * * * *